*Fig. 1* Solidifying thick body of emulsion with liquid droplets held in place.
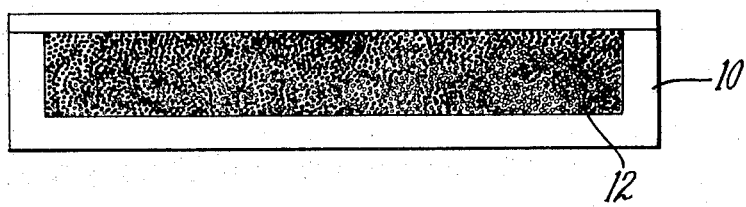
*Fig. 2* Slicing thick solidified body with liquid droplets in place.
*Fig. 3* Evaporating liquid from slice.
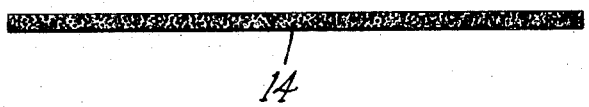
Inventor
John T. Day
By his Attorney
Benjamin C. Pollard 3,565,982
PROCESS OF MAKING MICROPOROUS SHEETS
John T. Day, Manchester, Mass., assignor to USM Corporation, Flemington, N.J., and Boston, Mass., a corporation of New Jersey
Filed May 17, 1968, Ser. No. 729,890
Int. Cl. B29d 27/04
U.S. Cl. 264—53                                            5 Claims

ABSTRACT OF THE DISCLOSURE

A thin, microporous sheet having excellent structural uniformity and permeability is formed by casting and solidifying a thick body of a liquid emulsion of which the continuous phase is based on liquid polymeric material reactive to form a flexible, resilient solid and the discontinuous phase is fine droplets of a volatile liquid immiscible and nonreactive with the continuous phase. The solidified body is sliced into sheets of the desired thickness while the liquid droplets are retained in the solidified material and thereafter the liquid is removed from the sheets leaving pores and discontinuities in the solidified material.

FIELD OF USE, BACKGROUND AND PRIOR ART RELATIVE TO THE INVENTION

In the prior application of John J. McGarr entitled "Composition and Processes for Making Microporous Bodies," Ser. No. 500,155, filed Oct. 21, 1965 which is assigned to the assignee of the present invention and now abandoned there is disclosed a process in which a thin, microporous sheet is formed by spreading in a thin layer an emulsion including controlled size droplets of a volatile liquid immiscible and nonreactive with a continuous phase which includes a liquid polymeric material reactive to form a flexible resilient solid. In that process the continuous phase of the emulsion reacts to form a tough, solidified material with droplets of the non-solvent liquid retained in the solidified body and this liquid is then removed leaving spaces constituting openings or pores in the solidified material.

Products so obtained have had good strength, appearance and other desirable properties for use in garments and in shoe uppers. However, portions of the sheets so formed adjacent the exposed surface of the layer have been nonporous, and, where breathability and water vapor permeability are important, the nonporous surface has been removed, generally by abrasion.

SUMMARY OF THE INVENTION

It has now been found that a thin, microporous sheet with good uniformity and permeability may be formed by casting and solidifying a thick body of a reactive emulsion system having a disperse phase of fine droplets of non-solvent liquid. When the emulsion becomes solid the droplets are retained in the solidified body. At this stage, the body is sliced into sheets of the thickness desired in the final product while the non-solvent liquid remains within the solidified body. Thereafter, the non-solvent liquid is removed from the sheets leaving spaces constituting openings or pores in the solidified material. It is found that the surfaces of the sheets do not become nonporous even though the slicing may have been accomplished before completion of the cure of the reacted material.

BRIEF DESCRIPTION OF THE DRAWING

Reference is made to the attaching drawings illustrating the process of the present invention:

FIG. 1 is a diagrammatic sectional elevational view of a mold filled with a body of reactive emulsion;

FIG. 2 is a diagrammatic elevational view of the solidified molded body being sliced to form a thin sheet; and FIG. 3 is a diagrammatic elevational view of a thin sheet sliced from the solidified body from which dispersed liquid is being evaporated.

The body of microporous material for conversion into thin sheets is formed by casting in a mold 10, a thick body 12, of an emulsion of fine droplets of liquid in a continuous phase of reactive polymeric material. As described in the application of McGarr above referred to, the dispersed fine droplets maintain spaces in the polymeric material during the physical change in the course of the reaction of the polymeric material to form a solidified body of higher molecular weight.

Reactive materials for use in the present process are those for forming elastomeric polyurethane or polyurea reaction products and are selected on the basis of their ability to provide toughness, flexibility, hardness and other physical properties required in the final product. The reactive material may be a "one shot" mixture of an organic compound having at least two active hydrogens such as a polymeric polyol, e.g. polyalkylene ether polyol and/or polyester polyol, with a reactive compound having at least two reactive —NCO groups, e.g. a polyisocyanate. Alternatively, there may be used a prepolymer system in which an —NCO terminated reaction product of a polyol with excess polyisocyanate is combined with chain extenders which may be polyhydroxy or polyamine compounds.

Polyol materials or prepolymers which at room temperature are solid or pasty are generally preferred. The term "pasty" refers to consistency which may be very high viscosity or may be partially solid, which is capable of permanent deformation or even flow under substantial pressure, but which does not allow rapid uniform mixing with other reagents and with the non-solvent liquid component to form an emulsion using ordinary mixing and emulsifying equipment such as a high shear propeller type mixer. That is, many polyol or prepolymer materials which are sufficiently fluid for effective emulsion forming at room temperatures tend to form an initial reaction product which is too soft to hold the dispersed non-solvent liquid droplets until gelation occurs so that the droplets of non-solvent liquid are not held in position to form a uniform cellular structure. In earlier work, a proportion of a true solvent was included to soften such solid or pasty materials to allow emulsion forming; but the presence of the solvent resulted in a product which was somewhat swelled and which shrank and lost some measure of porosity when the solvent was removed. This difficulty is avoided by using heat to reduce the solid or pasty materials to fluid state for emulsion forming.

Polyols useful in the "one shot" mixture or for forming the reactive prepolymer include substantially linear or only moderately branched polyether polyols, and substantially linear or moderately branched polyester polyols from the condensation of polybasic acids, e.g. adipic acid, sebacic acid, azelaic acid, dimerized linoleic acid and other aliphatic and aromatic dibasic acids with polyols such as butane diol, ethylene glycol, propylene glycol and the like. Castor oil is also a suitable polyol for making a prepolymer. Controlled portions of polyols or polybasic acids having more than two reactive OH or —COOH groups may be included in the compositions reactive to form polyester polyols to introduce moderate branching or cross linking.

Prepolymers are made by well understood procedures involving reaction of the polyether polyols or the polyester polyols with organic polyisocyanates including the toluene diisocyanates, methylene diisocyanates and the like. A proportion of polyisocyanate material having more than two reactive isocyanate groups may be included to provide a desired extent of cross linking.

The action of the non-solvent pore-forming liquid is primarily physical, that is, the non-solvent liquid is a readily removable space filler which is present as dispersed droplets until the reactive continuous phase at least partially solidifies around the droplets. Removal is effected without expansion of the solidified body. Suitable liquids may readily be selected by a chemist on the basis of the known physical properties of liquids. Any liquid having substantial non-solvency and non-reactivity with the polymeric material together with suitable volatility characteristics may be used. Normally liquid aliphatic hydrocarbons including petroleum hydrocarbon fractions, particularly those commercially available as mineral spirits, petroleum naphtha and kerosene which are largely or completely aliphatic in composition are generally preferred because of their low cost and satisfactory behavior in the composition; but other substantially inert organic liquids such as liquid alkyl ethers, e.g. amyl ether may be used. To avoid premature evaporation from the emulsion so that it can serve its space filling function until the continuous phase has solidified, the pore-forming liquid is chosen to have a boiling point above the selected mixing and reaction temperatures and should preferably have a boiling point of at least about 100° C. and preferably at least 130° C. to allow use of temperatures giving a desirable fluidity and rate of reaction of the polymeric material. On the other hand the liquid will be chosen with high enough vapor pressure for removal without heat injury to the solidified body. Thus the liquid should ordinarily not contain substantial quantities of high boiling or low volatility components, and preferably should not contain components boiling at a temperature of over 450° F. It is to be understood that other means than evaporation, e.g. extraction may be used to remove high boiling or low volatility liquid and in such cases the upper limit of boiling point does not apply.

The extent of heating of the reactive polymeric material needed to bring the material to a suitably low viscosity, which may be of the order of 6000 centipoises, for emulsion forming depends on the properties of the material. Higher melting point and higher molecular weight reactive polymeric materials require higher temperatures. Polymeric materials giving the desired improvement in retention of uniform droplet distribution of the emulsion in layer form call for heating to a temperature of at least about 50° C.

Dispersion of droplets of the pore-forming liquid in the heated liquid body of reactive polymeric material to form an emulsion in which the reactive polymeric material is the continuous phase, is effected by vigorous agitation during the course of addition of the pore-forming liquid to the body of polymeric material. Emulsifying agents are useful to aid in dispersing the liquid in the polymeric material and to stabilize the resulting emulsion. The selection of emulsifying agents is readily made by a chemist acquainted with the techniques of emulsion forming. Preferred emulsifying agents have included anionic and non-ionic surface active agents such as commercially available silicone emulsifiers, partial long chain fatty acid esters and the polyoxyalkylene derivatives of such esters, also sulfuric acid esters of long chain fatty alcohols, etc.

The amount of pore-forming liquid dispersed will vary with the desired porosity of the final product and may vary from as low as 25 parts of the liquid to 100 parts of the polymer up to as high as 300 parts of the liquid to 100 parts of the polymer material. It is preferred to use from about 60 parts to about 200 parts of liquid to 100 parts of the polymeric material. It is desirable that the mechanical conditions of dispersion of the liquid and the polymer be controlled to form very small droplet sizes of which the majority will be in the range of from about 0.0001 to about 0.03 mm. in diameter.

Reaction of the polymeric material to higher molecular weight solid condition is brought about and controlled by the time and temperature conditions of bringing together of the reactive components and/or by the introduction of catalyst. In the one step process in which a polymeric polyol such as the polyether polyol or polyester polyol is reacted with a polyisocyanate, mixing and emulsification involves bringing together these materials together with the liquid to be dispersed and a catalyst, such as stannous octoate or lead naphthenate, effective to control the reaction rate. It will be understood that where reaction occurs at so fast a rate that it is difficult to complete the emulsion before excessive increase in viscosity or solidification of the polymeric material takes place, the pore forming liquid may be emulsified in one of the reagents usually the polyether or polyester polyol before combination with the polyisocyanate.

In the two step process, an —NCO terminated prepolymer prepared from a polymeric polyol such as a hydroxyl terminated polyether or polyester and a polyisocyanate, the pore forming liquid, and chain extenders reactive with the prepolymer to give higher molecular weight materials are combined and emulsified with the prepolymer material forming the continuous phase. Chain extenders effective to increase the molecular weight of the prepolymer are compounds having two or more active hydrogen atoms such as p,p'-methylenedianiline, 4,4'-methylene-bis-(2-chloroaniline), trimethylolpropane, m-phenylenediamine, 1,4 butane diol and triethanolamine.

The emulsion is cast in a mold 10 promptly after formation and prior to such time as the reaction has proceeded to a point where gelling of the composition through increase in molecular weight has occurred. The mold 10 used may have the desired outline size and shape of the sheets 14 to be produced and will provide a thickness at least several times the thickness of the final sheets to be made. The continuous phase of the emulsion is solidified by development of higher molecular weight through reaction of the polymeric material and when solidified entraps the droplets of liquid. At this point the body of solidified material may be removed from the mold.

The body 12 of solidified material with the liquid droplets entrapped in it may be sliced into sheets 14 of the desired thickness before curing is complete when the material has developed mechanical stability enabling it to withstand slicing stresses. A measure of this is the ability to withstand at least about 2% to 5% and preferably to withstand about 10% compression without damage to its structure. Conventional slicing devices such as a band knife splitter may be used. In the slicing operation, the liquid droplets give body to the mass of material and also have a lubricating and cooling action on the slicing blade 16 so that smooth surfaced sheets of uniform thickness are obtainable at a good rate, and overheating of the blade and distortion of the surface are avoided. Uniform sheets have been regularly obtained at thicknesses down to .005".

After slicing, the sheets 14 are subjected to further treatment to complete the cure. This further curing treatment, usually involving heating to temperatures below the boiling point of the dispersed liquid insures removal by evaporation of the liquid of the entrapped droplets as the cure is completed. It is to be observed that owing to the physical state of the solidified at least partially cured polymeric material at the time of this further heating, the liquid of the droplets is able to escape without notable enlargement of the pores, this escape occurring through passageways in the continuous phase of the polymeric material.

The following examples are given to aid in understanding the invention but it is to be understood that the invention is not restricted to the materials, proportions or procedures of the examples.

Example I 68.7 grams (0.0687 mol) of a normally solid at room temperature hydroxyl terminated polybutylene adipate having an hydroxyl number of 112, an acid number of 0.4 and a molecular weight of 1000 which had been liquefied and degassed at 100° C. was mixed with 3.44 grams of a polyoxyalkylene ether having an OH number of 20 which is solid at 25° C. and the mixture was brought to a temperature of 80° C. 137 cc. of a liquid, paraffinic hydrocarbon mixture (boiling range 346° F. to 405° F.) was added slowly to the heated mixture of polybutylene adipate and polyoxyalkylene ether with vigorous agitation to form an emulsion with the hydrocarbon as the internal phase. 6.30 grams (0.0699 mol) of 1,4 butane diol was added, followed by 34.35 grams (0.1373 mol) of p,p'-diphenylmethane diisocyanate which had been liquefied by heating to 60° C. After 4¼ minutes agitation, the resulting reactive emulsion was cast as a slab 0.5 inch in thickness in a silicone treated mold. The slab was held overnight in a covered chamber at 80° C., to gel the reaction product while impeding evaporation of the hydrocarbon. At this stage, the reaction had progressed to an extent that the slab of cast material could be removed from the mold and could be compressed 10% without harm to its structure. The slab was next split into sheets 0.06 inch in thickness on a commercial band knife leather splitter. The sheets were uniform in thickness and the surfaces were free from distortion. The sheets were held 24 hours at 105° C. to complete the cure and to remove the emulsified liquid hydrocarbon by evaporation. The resulting sheets were tough and snappy with a water vapor permeability of about 1.94 gms./30 cm.$^2$/24 hours/64 mils. When this film was formed into a shoe vamp it survived over 578,000 flexes without cracking.

Example II 130 grams (0.0844 mol) of —NCO terminated prepolymer prepared by reaction of p,p'-diphenylmethane diisocyanate and hydroxyl terminated polybutylene adipate in a mol ratio of 2:1, the resulting prepolymer having a molecular weight of 1540, and being a solid at room temperature was liquefied and degassed at 100° C. and mixed with 3.9 grams of a polyoxyalkylene ether having an hydroxyl number of 20 which is a solid at 25° C. and the mixture was brought to a temperature of 70° C. 148 cc. of the liquid hydrocarbon mixture used in Example I was emulsified into the resulting hot mixture. 7.75 grams (0.0860 mol) of 1,4 butane diol was added and mixed in. After 2 minutes agitation, the reactive emulsion was centrifuged to remove bubbles and cast in a mold as a slab 0.5 inch in thickness. The slab was held overnight in a covered chamber to gel the reaction product. The cover was removed and the slab was removed from the mold, sliced into 0.06 inch thickness sheets and held for 24 hours, at 105° C. to cure them and to evaporate off the liquid hydrocarbon. The sheets had a permeability of 1.09 grams/30 cm.$^2$/24 hours/50 mils. When a sheet was formed into a shoe vamp, the flex life was over 732,000 flexes.

Example III 64.1 grams (0.0799 mol) of a normally solid hydroxy terminated polyester derived from caprolactone and having an hydroxyl number of 139, an acid number of 0.4 and a molecular weight of 803, was liquefied and degassed at 100° C. and mixed with 3.2 grams of a polyoxyalkylene ether having an hydroxyl number of 20 which was normally solid at 25° C. The heated mixture was brought to a temperature of 80° C. 112 cc. of the liquid hydrocarbon mixture employed in Example I was emulsified into the heated mixture. 7.35 grams (0.0815 mol) of 1,4 butane diol was added. 40 grams (0.1600 mol) of p,p'-diphenylmethane diisocyanate at a temperature of 60° C. was added to the emulsion with agitation. After 3½ minutes agitation the reactive emulsion was centrifuged and then cast as a slab, and held overnight at 80° C. in a covered chamber. The slab was then removed from the mold, split into sheets and treated to remove liquid hydrocarbon and complete the cure of the material as in Example I. The resulting sheets had a permeability and vamp flex life in a range useful for shoes.

Example IV 160 grams (0.1169 mol) of a normally solid, —NCO terminated prepolymer prepared by reaction of p,p'-diphenylmethane diisocyanate and hydroxyl terminated polyester derived from caprolactone in the mol ratio of 2:1, the resulting prepolymer having a molecular weight of 1370, was liquefied and degassed at 100° C. and mixed with 1.60 grams of a polyoxyalkylene ether having an hydroxyl number of 20. The mixture was brought to a temperature of 70° C. 172 cc. of the liquid hydrocarbon used in Example I was emulsified into the heated prepolymer. 10.72 grams (0.1192 mol) of 1,4 butane diol was added and thoroughly mixed in. After 2 minutes agitation, the reactive mixture was centrifuged to remove bubbles and cast as a slab 0.5 inch thick. The slab was held overnight at 80° C. in a covered chamber to gel the reaction product. The slab was then removed from the mold, split into sheets and treated to remove liquid hydrocarbon and complete the cure of the material as in Example I. The resulting sheets had a permeability of 0.6 gram/30 cm.$^2$/24 hours/44 mils and a vamp flex life of over 763,000 flexes.

Example V 200 grams (0.205 mol) of polytetramethylene ether glycol, having an hydroxyl number of 115 and a molecular weight of 975 was liquefied and degassed at 100° C. and mixed with 10 grams of a polyoxyalkylene ether having an hydroxyl number of 20. The mixture was brought to a temperature of 50° C. 325 cc. of the liquid hydrocarbon mixture used in Example I was emulsified into the heated mixture of glycol and polyoxyalkylene ether. 102.5 grams (0.410 mol) of p,p'-diphenylmethane diisocyanate at a temperature of 60° C. was added. After 9 minutes agitation 2.5 cc. of a 0.1% hydrocarbon solution of dibutyl tin dilaurate was added followed forty minutes later by 18.55 grams (0.206 mol) of 1,4 butane diol. After one minute agitation, the resulting reactive emulsion was centrifuged to remove bubbles and then cast as a slab 0.5 inch in thickness. The slab was held overnight at 80° C. in a covered chamber to gel the material. The slab was then removed from the mold, split into sheets and treated to remove liquid hydrocarbon and complete the cure of the material as in Example I. The resulting sheet had a permeability of 0.64 gram/30 cm.$^2$/24 hours/59 mils. The vamp flex life was over 408,000 flexes.

Example VI 160 grams (0.1036 mol) of a normally very viscous —NCO terminated prepolymer prepared by the reaction of p,p'-diphenylmethane diisocyanate and polytetramethylene ether glycol in a mol ratio of 2:1, the resulting prepolymer having a molecular weight of 1545, was heated to render it freely fluid and degassed at 100° C., and mixed with 1.60 grams of a polyoxyalkylene ether having an hydroxyl number of 20. The mixture was brought to a temperature of 50° C. 160 cc. of the liquid hydrocarbon mixture used in Example I was emulsified into the heated fluid prepolymer. 9.71 grams (0.1077 mol) of 1,4 butane diol was added. After 3 minutes agitation, the reactive mixture was centrifuged to remove bubbles and then cast as a slab 0.5 inch in thickness. The slab was held overnight at 80° C. in a covered chamber. The slab was then removed from the mold, split into sheets and treated to remove liquid hydrocarbon and complete the cure of the material as in Example I. The resulting sheets had a water vapor permeability of 0.30 gram/30 cm.$^2$/24 hours/58 mils. The vamp flex life was over 816,000 flexes.

Having thus described my invention what I claim as new and desire to secure by Letters Patent of the United States is:

1. The process of forming a microporous flexible sheet material comprising the steps of casting a slab of thickness at least several times the thickness of the desired sheet of a liquid emulsion of which the continuous phase comprises a liquid mixture reactive to form a tough, flexible, high strength elastomeric material, said reactive mixture comprising an organic compound providing at least two reactive —NCO groups per molecule and an organic compound having at least two active hydrogens per molecule for reaction with said —NCO groups to form a resilient polyurethane and the disperse phase of said emulsion comprising fine droplets of a volatile organic liquid substantially non-reactive with said compounds and substantially immiscible with said continuous phase, said liquid having a boiling point of at least about 100° C. and at least about 90% boiling below 232° C., said immiscible volatile organic liquid being present in amount of from 25% to about 300% by weight based on the weight of the reactive material, reacting said material at a temperature below the boiling point of said immiscible liquid to convert said slab to a solid with said droplets held in the solidified material, slicing said slab into sheets of the desired thickness while said liquid droplets are retained in said solidified material and thereafter removing said liquid from said sheets substantially without expansion of said sheets leaving pores and discontinuities in the solidified material to constitute passageways for air and vapor.

2. The process of forming microporous flexible sheets as defined in claim 1 in which at least one of said compounds in the reactive mixture is polymeric and is solid or pasty at room temperature, and said reactive mixture is substantially free of solvents for said reactive compounds and has a consistency at room temperature which interferes with emulsifying said immiscible liquid, heat is supplied to bring said mixture to freely fluid state and said immiscible liquid is dispersed in the continuous phase to form an emulsion while said mixture is in freely fluid state.

3. The process of forming microporous flexible sheets as defined in claim 2 in which said slab is sliced into sheets before complete curing but at a stage at which said slab can be compressed at least about 2% without damaging its structure.

4. The process of forming a microporous flexible sheet material as defined in claim 3 in which the removal of the immiscible liquid from the sheets is carried out by evaporation at a temperature below the boiling point of the liquid.

5. The process of forming microporous flexible sheets as defined in claim 4 in which said immiscible liquid is present in amount of from about 60% to about 200% by weight based on the weight of the reacted material and in which the droplets of immiscible liquid dispersed in the reactive mixture have a droplet size of from 0.001 to 0.03 mm.

References Cited

UNITED STATES PATENTS

| | | | |
|---|---|---|---|
| 2,296,305 | 9/1942 | Roberts | 264—55 |
| 2,304,717 | 12/1942 | Swart | 264—45X |
| 3,100,721 | 8/1963 | Holden | 264—41UX |
| 3,281,396 | 10/1966 | Barnes | 264—41 UX |
| 3,296,016 | 1/1967 | Murphy | 264—49X |
| 3,348,963 | 10/1967 | Fukushima et al. | 264—41UX |
| 3,369,925 | 2/1968 | Matsushita et al. | 264—41UX |
| 3,395,204 | 7/1968 | Olsson et al. | 264—157 |

PHILIP E. ANDERSON, Primary Examiner

U.S. Cl. X.R.

161—159, 190; 260—2.5, 77.5; 264—41, 158, 331, 345